United States Patent Office 3,419,447
Patented Dec. 31, 1968

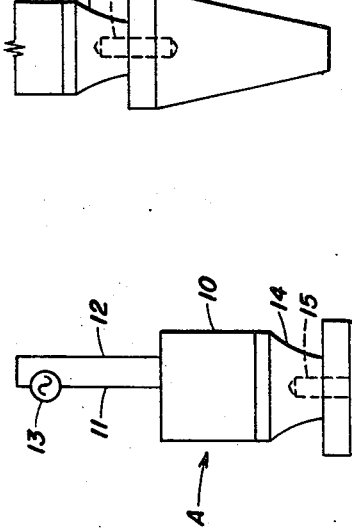

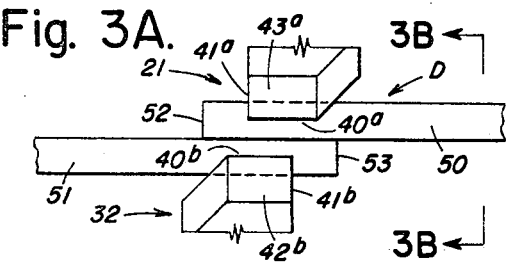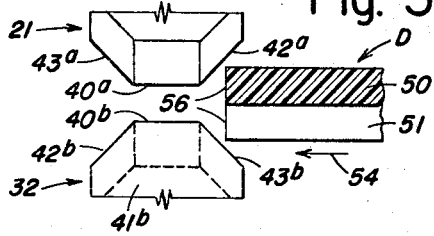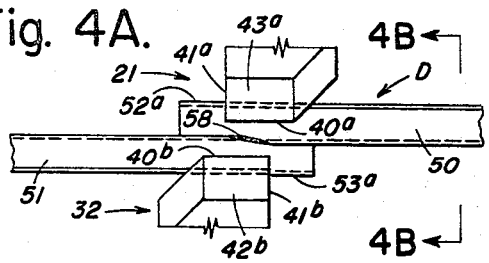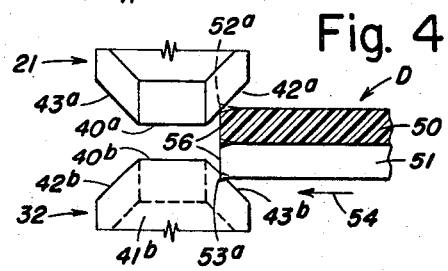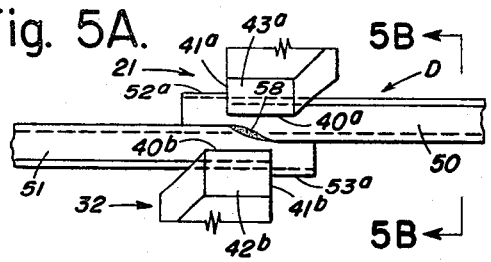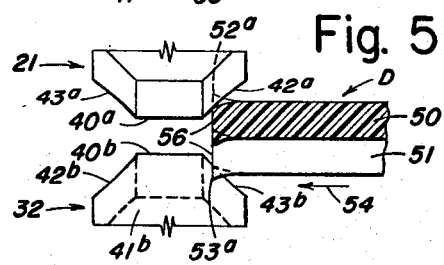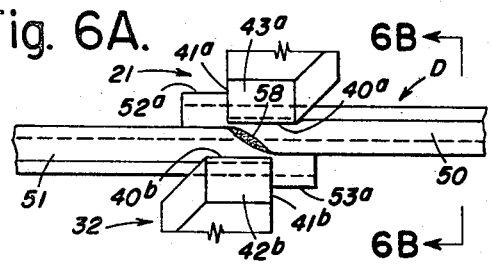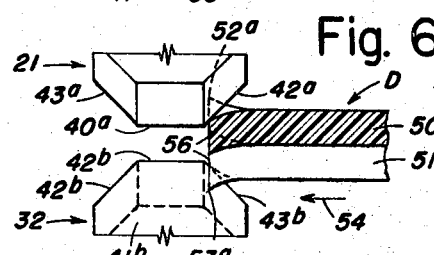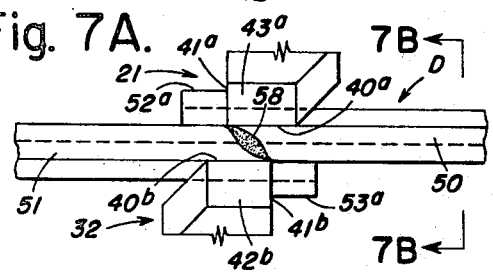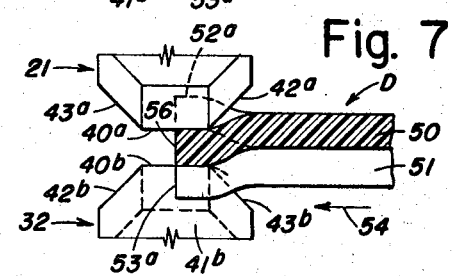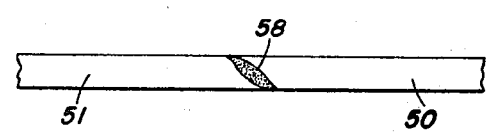

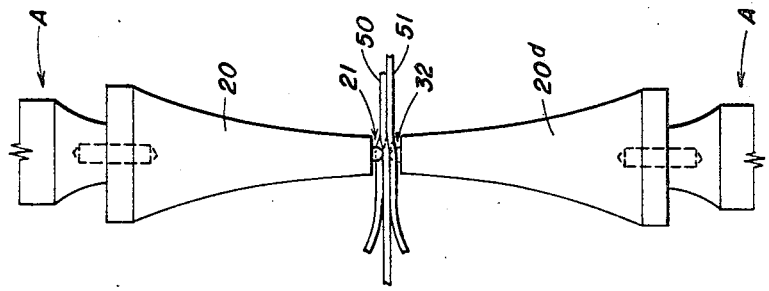
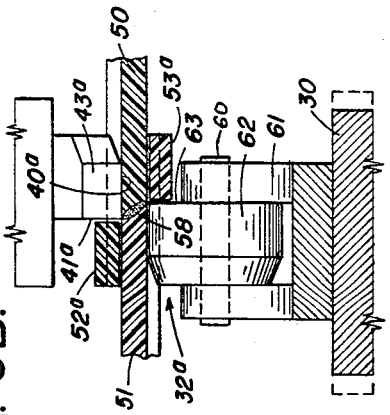
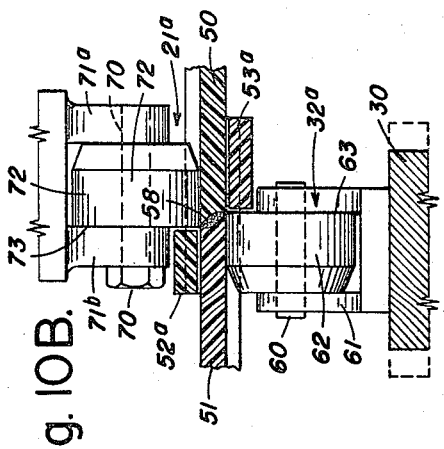
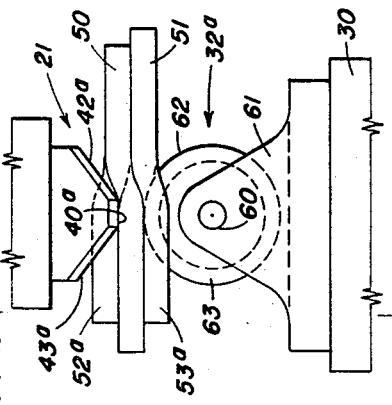
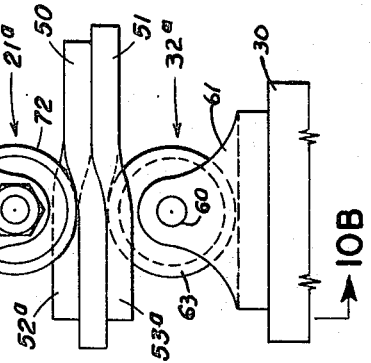

3,419,447
METHOD AND APPARATUS FOR BONDING TOGETHER TWO THERMOPLASTIC SHEETS BY ULTRASONIC ENERGY
Eugene E. Hewitt, Walkerton, Ind., assignor to Uniroyal, Inc., a corporation of New Jersey
Filed Mar. 22, 1965, Ser. No. 441,794
16 Claims. (Cl. 156—73)

ABSTRACT OF THE DISCLOSURE

A method of and apparatus for bonding thermoplastic sheets to one another wherein adjacent marginal regions of the sheets are overlapped to form an area of double thickness and this area is then passed between a pair of ultrasonically vibrating tools. The tools compress and heat an intermediate portion of said area and are constructed and arranged to concurrently (1) transpose the sheets into a common plane, (2) bond the sheets to one another in said intermediate portion, and (3) cut off a pair of unbonded edge portions of the marginal regions at the opposite sides of the bonded portions thereof and at the opposite faces of the sheets, respectively.

---

This invention pertains to a method of and apparatus for uniting thermoplastic materials, and, more particularly, to a method and apparatus employing oscillatory energy to butt seam thermoplastic sheet and film materials.

In many thermoplastic sheet applications it is necessary to make wide sheets of stock from which large parts, such as truck or trailer panels, can be formed. Since the widths of such sheets are limited by the widths of the apparatus (e.g., calender rolls) on which the sheets are made, it often becomes necessary to make wide sheets for such applications by joining together narrower sheets of stock, for example, by lap seaming or butt seaming. When lap seaming is employed, an unsightly, large ridge results at the area of juncture due to the double thickness of stock utilized in the lap seam. Moreover, when a number of lap seamed sheets are laminated to one another, the double thicknesses of the lap seams facilitate the trapping of air between the layers of the laminated product, causing blistering and separation therein. In order to avoid the problems attendant with lap seaming, known butt seaming techniques have been employed; however, these have also had disadvantages associated with them.

In conventional butt seaming of sheet plastic materials, it is necessary to cut extremely accurate, straight edges on each of the sheets being joined in order to have continuous contact between the stock edges during the seaming operation, thereby to eliminate voids in the seams. This procedure is time consuming and involves costly equipment. Moreover, it has heretofore been extremely difficult, at best, to butt seam sheets in a continuous operation. Another disadvantage of conventional butt seaming techniques is that the strength of the butt seam obtainable with such techniques has been significantly less than the strength of either an unseamed sheet or a lap seamed sheet.

Accordingly, the main object of the present invention is to provide improved methods of and apparatus for uniting thermoplastic sheets or films.

An additional object of this invention is to provide improved methods of and apparatus for joining thermoplastic sheets or films with edge-to-edge or butt welded joints of high strength, at rapid seaming rates.

A further object of this invention is to provide improved apparatus having a high degre of flexibility for butt seaming a wide variety of thermoplastic sheets or films.

Yet another object of this invention is to provide improved methods and apparatus for economically butt seaming thermoplastic sheets or films in continuous operations.

Further objects and advantages of this invention will become apparent as the following description proceeds.

Briefly stated, and in accordance with one embodiment of this invention, the improved method of uniting two sheets of thermoplastic material comprises overlapping the adjacent edges of the sheets to form an overlapped area, subjecting a predetermined zone of the overlapped area to compression and ultrasonic oscillatory energy to transpose the two sheets in said zone into a common plane and bond said sheets to one another in said zone, and, simultaneously with the transposition of the sheets, at least partially cutting each of said sheets between its edge and said zone to facilitate removal of the edge portion from the remainder of the sheet, thereby to form from said two sheets a single, planar sheet.

The improved apparatus for uniting sheets of thermoplastic material, in accordance with one embodiment of this invention, comprises first and second tools having respective, opposed, surfaces thereon which overlap in a predetermined zone, said surfaces being spaced from one another by approximately the thickness of one of the sheets to be joined and each being provided with a cutting edge at one end thereof, the cutting edge of one of said tools being at one end of said zone and the cutting edge of the other of said tools being at the other end of said zone; and means to vibrate at high frequency at least one of said tools, said tools being constructed and arranged to receive therebetween an overlapped, double thickness, portion of the sheets to be joined and to guide said double thickness of sheets between said surfaces, thereby to compress and transpose the overlapped sheets into a common plane at said zone, to bond said sheets to one another in said zone, and to cut from said sheets the edge portions thereof adjacent to said zone.

Although the specification concludes with claims particularly pointing out and distinctly claiming the subject matter which is regarded as the invention, it is believed that the invention will be better understood from the following description, taken in connection with the accompanying drawings in which:

FIG. 1A is an elevational view of one form of apparatus of this invention; and, FIGS. 1B, 1C and 1D illustrate alternative tool holders that may be used with the apparatus of FIG. 1A;

FIG. 2A is an enlarged elevational view of striker and anvil tools employed in the apparatus of FIG. 1A; and, FIG. 2B is a sectional elevational view taken along the line 2B—2B of FIG. 2A;

FIGS. 3A through 7A and 3B through 7B are series of end elevational and side elevational views, respectively, showing the method by which two sheets of thermoplastic material are bonded together in accordance with this invention;

FIG. 8 is an elevational view which shows the two sheets of FIGS. 3A through 7B joined into a unitary, planar sheet having a butt seam therein;

FIGS. 9A and 9B are views similar to FIGS. 2A and 2B, respectively, showing an alternative striker and anvil tool arrangement for the apparatus of FIG. 1A;

FIGS. 10A and 10B are elevational views similar to FIGS. 2A and 2B respectively, showing another striker and anvil tool arrangement for use in the apparatus of FIG. 1A; and, FIG. 11 is a view similar to FIG. 1A, illustrating yet another embodiment of this invention, which embodiment is particularly useful in joining together relatively heavy thermoplastic sheets.

Referring to FIG. 1A, there is shown an apparatus for butt seaming thermoplastic sheets in accordance with this invention. The apparatus comprises: a driver assembly, shown generally at A; an upper tool assembly, shown generally at B; a lower tool assembly, shown generally at C; and, the thermoplastic sheets that are being bonded together, shown generally at D.

The driver A may be any suitable high frequency vibrator such as, for example, one of the vibrators shown in U.S. Patent 3,022,814. For frequencies in the neighborhood of about 10 kilocycles per second, a mechanical vibrator is most suitable. In the range from 10 kilocycles to several hundred kilocycles per second, a magnetostriction or barium titanate vibrator is appropriate. Crystal vibrators may be used for still higher frequencies. All such types of drivers are known in the art and need not be elaborately described herein. The illustrative driver A may be of the barium titanate type, comprising a barium titanate hollow cylinder 10 provided on its inside and outside surfaces with silvered coatings (not shown). Leads 11 and 12 are connected to these coated surfaces and are led out to a suitable power source 13, which source will be understood to comprise a driving oscillator of the requisite frequency and a suitable amplifier. As is well known, a barium titanate hollow cylinder, energized on its opposite surfaces with a high frequency alternating current, alternately elongates and contracts at the frequency of the driving current. The cylinder 10 is preferably dimensioned to operate at resonance with upper tool assembly B at the designated operating frequency, and the driving oscillator 13 will be understood to be adjusted to supply power at this frequency. The barium titanate cylinder 10 may be clamped, welded or otherwise fastened by suitable means (not shown) to an adaptor 14 which, in turn, is suitably fastened, as by means of a bolt 15, to the upper tool assembly B.

Upper tool assembly B comprises a tool holder or rod 20 and a tool or striking means 21 fastened thereto by means of brazing, welding or the like. The tool holder may be a transformer or mechanical amplifier, such as the exponential type shown at 20 in FIG. 1A, the straight taper type shown at 20a in FIG. 1B, or the stepped type shown at 20b in FIG. 1C; or it may be nonamplifying, such as the straight rod type shown at 20c in FIG. 1D. The tool holder 20 is designed to achieve the amplification and velocity desired for particular applications.

The tool holders 20, 20a, 20b and 20c and the cylinder 10, taken together, are beneficially dimensioned to have a length equal to a half wave length, or multiple thereof, for the frequency of operation of the driver A. Tool holders 20, 20a, 20b and 20c are composed of a suitable material having good elastic fatigue properties, such as steel, nickel, or the like. The frequency transmitted to the tool holders is preferably in the range of from 10 kilocycles to 500 kilocycles per second. Below 10 kilocycles per second objectionable audible noise results, and above 500 kilocycles per second transducer problems are encountered. The amplitude of vibration of tool 21 is desirably within the range of 0.0005 to 0.015 inch. When tool 21 travels less than about 0.0005 inch, satisfactory seaming may be difficult to accomplish. A travel of tool 21 greater than about 0.015 inch involves problems of design and of materials for the tool to withstand the stresses encountered.

The lower tool assembly C comprises a support plate 30, a lower tool holder 31 and a tool or anvil means 32. In the embodiment shown in FIGS. 2A and 2B, the tools 21 and 32 are exact duplicates of one another, with lower tool 32 being mounted in a position 180° reversed from that of upper tool 21. Tools 21 and 32 are provided with respective, parallel, confronting surfaces 40a and 40b which overlap in a predetermined amount, as shown in FIG. 2B, the overlapped portion being hereinafter referred to as a compacting zone. Support plate 30 (FIG. 2B) is preferably adjustably mounted relative to upper tool holder 20 so as to be transversely movable to any position located between limits defined by broken lines 30a and 30b, and to be able to be locked at such position. This adjustment allows the amount of overlap between surfaces 40a and 40b in the compacting zone to be varied within predetermined limits, thereby to effect variations in the butt seam made in the thermoplastic sheets D.

Tools 21 and 32 are provided with respective surfaces 41a and 41b which form right angles with the surfaces 40a and 40b, thereby providing cutting edges at the intersections of these surfaces. In addition, sloped surfaces 42a and 43a are provided on tool 21 and corresponding sloped surfaces 42b and 43b are provided on tool 32. Surfaces 42a and 43b (FIG. 2A) serves as entrance guides which help to lead the thermoplastic sheets D into the compacting zone between surfaces 40a and 40b. In addition, surfaces 42a and 43b cooperate with respective surfaces 41a and 41b to form cutting edges which are continuations of the cutting edges formed by surfaces 40a and 41a and surfaces 40b and 41b, respectively. Thus, the edge defined by the intersection of surface 41a with surfaces 42a and 40a of tool 21 represents a cutting edge which operates on the upper thermoplastic sheet entering the area between tools 21 and 32, and the edge defined by the intersection of surface 41b with surfaces 43b and 40b of tool 32 performs a similar function on the lower thermoplastic sheet entering this area.

Referring to FIGS. 3A and 3B, the thermoplastic sheets D to be joined comprise a first or upper sheet 50 and a second or lower sheet 51 which are introduced into the apparatus of this invention with their respective adjacent marginal portions 52 and 53 overlapping to an extent that is at least as great as the amount by which opposing surfaces 40a and 40b of the tools 21 and 32 are overlapped, and preferably is slightly greater. As illustrated in FIG. 3A, the thermoplastic sheets 50 and 51 are moving toward the viewer, in a direction that is perpendicular to the plane of the paper. As viewed in FIG. 3B, the sheets 50 and 51 are moving to the left, in the direction of the arrow 54.

Considering now FIGS. 3A through 8, the manner in which two overlapped, unbonded sheets 50 and 51 of FIG. 3A are processed into the single, planar, butt seamed thermoplastic sheet of FIG. 8 will now be considered. To improve clarity, and for ease of understanding the operation of the method and apparatus of this invention, the overlapped portions of sheets 50 and 51 are shown in various steps during their movement from a position clear of the opposing tools 21 and 32 to a position fully engaged by the tools. In normal operation, however, a fixture is provided by means of which one or the other of tools 21 and 32 may be vertically displaced to allow introduction of the leading edge 56 (FIG. 3B) into the space between surfaces 40a and 40b of tools 21 and 32. At this point oscillatory energy is applied to tool 21 and the tools are then brought to and held at a position wherein the space between the tools is approximately equal to the thickness of one of the thermoplastic sheets being bonded when tool 21 is in its position of extreme vibratory movement toward lower tool 32. This facilitates the commencement of operations during actual usage of the apparatus.

As indicated earlier, however, for purpose of clarity of illustration the operation is herein considered to commence with the leading edge 56 of sheets 50 and 51 being moved toward the entrance or guide surfaces 42a and 43b (FIG. 3B), the tools 21 and 32 spaced apart a distance of approximately the thickness of one sheet, and the upper tool 21 being vibrated by the driver assembly A of FIG. 1A.

Referring to FIGS. 4A, 4B, 5A and 5B, as the leading edge 56 of each sheet 50 and 51 contacts a guide surface 42a or 43a (FIG. 4B), the material immediately beneath surface 42a and above surface 43b begins to compact and heat up due to the vibration of tool 21. Moreover, the relative movement of the cutting edges defined by the intersection of surfaces 41a and 42a on tool 21 and the intersection of surfaces 41b and 43b on tool 32 causes the edge portion 52a of sheet 50, which edge portion is located to the left of surface 41a in FIG. 4A, to start severing from the remainder of the sheet 50, and causes the edge portion 53a of sheet 51, which edge portion is located to the right of surface 41b in FIG. 4A, to start severing from the remainder of the sheet 51. Further, the remaining leading portions of sheets 50 and 51 start shifting or becoming displaced from their original planes as they engage tools 21 and 32 and move or transpose toward one another to a common plane. This effect is shown progressively in FIGS. 4A and 4B, 5A and 5B, 6A and 6B, and 7A and 7B.

Accordingly, by the time the leading edges 56 of sheets 50 and 51 have completely entered into and moved a portion of the way through the compacting zone between surfaces 40a and 40b, the leading portion of sheets 50 and 51 have been transposed or moved into a common plane, as shown in FIGS. 7A and 7B. Moreover, the heat generated in the compacting zone defined by the space between the surface 40a (FIG. 7A) of the upper tool 21 and the surface 40b of the lower tool 32 causes the compacted material of sheets 50 and 51 in this zone to fuse together, thereby bonding the materials in this area. Any excess material beyond that readily capable of being compressed and fused into a butt seam 58 in the compacting zone extrudes out of this zone and into the area of the edge portions or strips 52a and 53a. Thereafter, due to the cutting action at surfaces 41a and 41b, the edge portions 52a and 53a of sheets 50 and 51 become severed from the remainder of the sheets and may be removed from the apparatus at the same rate of speed as the sheets 50 and 51 are fed through the apparatus. The edge portions 52a and 53a of the sheets may then be reprocessed for subsequent usage in new sheets 50 and 51.

It will be apparent from FIGS. 3A through 8 that once the upper tool 21 has been lowered to the desired point with respect to the lower tool 32 the overlapped sheets may be continually fed through the compacting zone. Accordingly, the sealing and shearing operation is a continuous one, limited only by the length of the sheets being seamed. The sheets may be manually or mechanically drawn through the compacting zone and as they pass out of this zone their edges 52a and 53a are readily removed. With this technique the overlapped margins of the sheets can be irregular since the edge portions are removed as reusable scrap.

Referring to FIG. 3B, the angle formed by guide surfaces 42a and 43b establishes the ratio between the volume of material fed to the tools and the volume of material welded in each stroke. By changing the entrance angle defined by surfaces 42a and 43b and/or the area encompassed in the overlapped compacting zone of surfaces 40a and 40b, the cutting and welding functions of the tools can be proportioned relative to one another to achieve any desired optimum.

Although the invention has heretofore been described in connection with butt seaming sheets of essentially the same thickness, it should be noted that the apparatus and method of this invention can also be utilized in joining sheets of different thickness. In this regard, the distance of the upper tool 21 from the lower tool 32 is critical only to the degree that it affects the appearance of the ultimate joint. For example, a first sheet 0.030 inch thick and a second sheet 0.020 inch thick can be joined together in a butt seam in which the strength of the butt seam is about equal to the strength of the unjoined thin sheet.

Assuming that the spacing between tools 21 and 32 is substantially equal to the thickness of the thinner sheet, the edge strips 52a and 53a will be severed from their respective sheets 50 and 51 as in the case of joining sheets of equal thickness. If the spacing between tools 21 and 32 is initially set to the thickness of the thicker sheet, the edge strips 52a and 53a will then be cut through to a slightly lesser degree than in the instance just described and will require manual or mechanical tearing to be completely severed from the remainder of the sheets 50 and 51. As a result of such tearing, there remains a slight ridge adjacent each side of the butt seam, affecting the appearance of the joint. Further separation of the tools beyond the thickness of the thicker sheet results in less and less compacting of the material at the joint and less and less cutting through of the edge portions 52a and 53a from the remainder of their sheets. Although slightly greater spacing than the thickness of the larger sheet can be tolerated, appreciably greater separations should be avoided.

In the modification shown in FIGS. 9A and 9B, the upper tool 21 is the same as that shown in FIGS. 2A through 7B. However, in place of the lower tool 32 of those figures, a generally cylindrical, rotatable, lower tool 32a is provided. Tool 32a is rotatably supported on a pin 60 carried in a U-shaped tool holder 61. Holder 61 is fixed to movable support plate 30. Tool 32a includes a compacting surface 62, which corresponds to surface 40b of tool 32 (FIG. 2A), and a cutting surface 63, which corresponds to surface 41b of tool 32. The operation of tools 21 and 32a of FIGS. 9A and 9B is substantially the same as that previously described in connection with tools 21 and 32 of FIGS. 2A through 7B. In this case, however, the diameter of tool 32a helps to establish the entrance angle and the shape of compacting surface 62 of tool 32a. By varying the diameter of the tool (e.g., by changing tool 32a), the relationship of the entrance angle of the tools to the compacting area between the tools may be varied, allowing a change in the applications in which the tools may be utilized.

The arrangement of FIGS. 9A and 9B facilitates rapid changing of the lower tool via removal and reinsertion of pin 60. The pin 60 may be retained in place by conventional means (not shown), such as cotter pins, snap rings, or set screws. Moreover, due to the fact that tool 32a is rotatable about pin 60, the portion of compacting surface 62 and cutting surface 63 that cooperates with tool 21 is spread over its circumference. This feature allows for longer operating periods between maintenance shut downs for tool repair or replacement.

In the embodiment of FIGS. 10A and 10B, the upper tool 21 has been replaced by a rotatable tool 21a similar to tool 32a of FIGS. 9A and 9B. Upper tool 21a of FIGS. 10A and 10B is supported on a bolt 70 which is carried by a bracket 71 that is fastened to the upper tool holder 20 (FIG. 1A). Bolt 70 (FIG. 10B) is provided with a threaded portion (not shown) which threadedly engages leg 71a of bracket. When bolt 70 is tightened, it compresses legs 71a and 71b of bracket 71 against the sides of upper tool 21a, thereby locking the tool in position relative to the bracket. This feature allows rapid changing of upper tool 21a and permits selective rotation of the tool in order to distribute wear on its compacting surface 72 and on the cutting edge formed by the intersection of compacting surface 72 with vertical surface 73.

The embodiment shown in FIG. 11 may be employed when it is desired to butt seam thermoplastic sheets of relatively heavy gauge, such as sheets of 0.040 inch thick and greater. In this embodiment driver assemblies A are employed to vibrate both the upper tool 21 and the lower tool 32. The basic action and operation of this embodiment is similar to that previously described in connection with FIGS. 1 through 10, except that in this case the bottom tool 32 is independently vibrated. To facilitate this, tool 32 is carried by an amplifying tool holder 20d which may be similar to the holders 20, 20a, 20b and 20c described in connection with FIGS. 1A to 1D.

In the embodiment of FIG. 11, twice the energy is available to do the work and, since both tools vibrate, the combined amplitude of movement of the two tools 21 and 32 is double that found in the embodiments of FIGS.

1 through 10. Accordingly, in this embodiment sheets of greater thickness can be joined together, and the rate of seaming of such sheets can be increased substantially. Moreover, the gain in efficiency achieved in the embodiment of FIG. 11 is greater than that which would be expected from merely doubling the power employed. This is due to the fact that both tools are performing work on the sheets and the loss of energy which results from vibrating both sheets by means of the movement of only the top tool is diminished. In effect, there is less loss of energy due to the damping action inherent in the thermoplastic sheets when each sheet is independently vibrated than when the vibration energy to one of the sheets must be transmitted through the other of the sheets.

Optimum performance of the FIG. 11 embodiment during relatively low frequency operation (e.g., 10,000 c.p.s.) is achieved when tools 21 and 32 are synchronized in their movements toward each other and away from each other. However, when the frequency employed is 30,000 c.p.s. or greater, the need for synchronism becomes negligible because at this frequency the mass of the thicker sheets precludes the sheets from undergoing substantial sympathetic vibration along with the tools.

From the foregoing description it will be obvious that this invention provides an improved method of and apparatus for uniting thermoplastic sheets and films with butt seamed joints of high strength. The techniques described herein can be used to continuously butt seam themoplastic sheets as the sheets are fed from storage rolls, without requiring critical alignment of the edges of the sheets being joined. It is merely necessary to so arrange the storage rolls as to provide an adequate overlap of the adjacent margins of the two sheets to facilitate use of the herein-described equipment. The butt seaming operation can take place at rapid seaming rates, which rates are determined by the design and power capabilities of the equipment employed.

By shaping the outlet surfaces 43a and 42b (see FIG. 3B) similar to the inlet surfaces 42a and 43b, the process can be made reversible so that the direction of feed of the sheets 50 and 51 to the tools 21 and 32 can be reversed. Reversibility of feed is also inherent in the embodiments of FIGS. 9A, 9B, 10A, 10B and 11. Also, as indicated earlier herein, the apparatus and method can be employed to beneficially join sheets of different gauge in a butt seam.

While particular embodiments of this invention have been shown and described herein, it will be obvious to those skilled in the art that various changes and modifications may be made without departing from this invention in its broader aspects, and it is, therefore, aimed in the appended claims to cover all such changes and modifications as fall within the true spirit and scope of this invention.

Having thus described my invention, what I claim and desire to protect by Letters Patent is:

1. A method of bonding together two thermoplastic sheets comprising:
   (A) overlapping adjacent edge portions of said sheets to form an area of double thickness;
   (B) subjecting a predetermined zone of said overlapped area to compression and to vibration having a frequency of 10,000 c.p.s. to 500,000 c.p.s. and an amplitude of from 0.0005 inch to 0.015 inch to transpose the sheets in said zone into a common plane and to bond said sheets to one another in said zone; and,
   (C) cutting through each of said sheets at the end of said zone nearest the edge of each sheet, thereby to form from said two sheets a single planar sheet having a butt seam therein,
said steps involving the transposing of the sheets and the cutting through each of the sheets occurring simultaneously.

2. A method of joining two thermoplastic sheets, comprising:
   (A) overlapping adjacent margins of said sheets to form an area of greater thickness than either sheet;
   (B) compressing and heating transversely aligned first portions of said margins to
      (1) transpose said sheets into a substantially common plane,
      (2) bond said sheets to one another, and,
      (3) reduce the combined thickness of said area at said first portions to substantially the thickness of one of said sheets, excess thermoplastic material in the first portions of said margins flowing into the second portions of said margins during the compressing and heating of said first portions in order to reduce the combined thickness of said area at said first portions of said margins; and,
   (C) cutting away nonaligned second portions of said margins,
thereby to form said two sheets a single, substantially planar sheet having a butt seam therein.

3. A method of joining two thermoplastic sheets as described in claim 2 wherein the cutting away step occurs concurrently with the compressing and heating step 4. Apparatus for butt seaming two sheets of thermoplastic material having an overlapped marginal area, comprising:
   (A) first and second confronting tools spaced apart approximately the thickness of one of said sheets and adapted to receive said marginal area therebetween;
   (B) means for vibrating one of said tools at high frequency to compress and bond said sheets between said tools;
   (C) and means on each of said tools to cut an unbanded edge portion of each sheet from the adjacent bonded portion thereof,
thereby to form from said overlapped sheets a single thickness, butt seamed, unitary sheet of thermoplastic material.

5. Apparatus for joining together overlapped pieces of thermoplastic material, comprising:
   (A) a pair of tools adapted to receive said pieces therebetween and having confronting, offset surfaces which overlap in a predetermined zone, each of said surfaces having one end thereof terminating in a cutting edge which defines one end of said zone; and
   (B) means for vibrating at high frequency at least one of said tools to simultaneously join said pieces along a line of juncture and cut off excess unbonded material adjacent to said juncture line.

6. Apparatus for joining overlapped sheets of thermoplastic material with a butt seam, comprising:
   (A) first and second tools adapted to receive said overlapped sheets therebetween and having respective opposed surfaces thereon which overlap in a predetermined zone,
      (1) each of said surfaces being provided with a cutting edge at one end thereof defining said zone therebetween,
      (2) the cutting edge of each of said surfaces being opposite a continuous portion of the other of said surfaces,
      (3) said surfaces being spaced apart by approximately the thickness of one of the sheets to be joined; and
   (B) means to vibrate at least one of said tools at a frequency of from 10,000 c.p.s. to 500,000 c.p.s., the amplitude of vibration being from 0.0005 inch to 0.015 inch, thereby to simultaneously join said sheets along a line of juncture and cut off excess unbonded material adjacent to said juncture line.

7. Apparatus as described in claim 6 wherein said surfaces are planar and parallel to one another.

8. Apparatus as described in claim 6 wherein one of said surfaces is planar and the other of said surfaces is cylindrical.

9. Apparatus as described in claim 6 wherein both of said surfaces are cylindrical and the axes of said cylindrical surfaces are parallel to one another.

10. Apparatus as described in claim 6 and further including means to vibrate the other of said tools at the same frequency as and at the same amplitude as said one of said tools is vibrated.

11. A method of bonding portions of thermoplastic sheets to one another comprising:
(A) arranging two of said sheets in at least partially superposed relation with respect to one another to form an area of double thickness;
(B) compressing and heating an intermediate zone of said double thickness area with ultrasonic energy to bond together within said zone and make coplanar first portions of said sheets while leaving a pair of second portions of said sheets at the opposite sides of said zone and at the opposite faces of said first portions of said sheets, respectively; and
(C) simultaneously with said compressing and heating step, at least partially cutting away said second portions of said sheets from said first portions thereof.

12. A method of bonding as claimed in claim 11 wherein said ultrasonic energy comprises vibrations having a frequency in the range of from 10,000 c.p.s. to 500,000 c.p.s.

13. A method of bonding as claimed in claim 12 wherein said ultrasonic vibrations have an amplitude in the range of from 0.0005 inch to 0.015 inch.

14. A method of bonding thermoplastic sheets to one another in side by side relationship comprising:
(A) overlapping adjacent marginal regions of said sheets to form an area of double thickness;
(B) compressing and heating an intermediate portion of said double thickness area with ultrasonic energy to transpose said sheets into a common plane and to bond said sheets to one another in said intermediate portion of said double thickness area while leaving a pair of unbonded edge portions of said marginal regions at the opposite sides of the bonded portions thereof and at the opposite faces of said sheets, respectively; and
(C) simultaneously with said compressing and heating step, cutting away said unbonded edge portions of said marginal regions from the bonded remainders thereof.

15. A method of bonding as claimed in claim 14 wherein said ultrasonic energy comprises vibration having a frequency in the range from 10,000 c.p.s. to 500,000 c.p.s. and an amplitude in the range from 0.0005 inch to 0.015 inch.

16. A method of bonding as claimed in claim 14 wherein excess thermoplastic material in said intermediate portion of said double thickness area flows into the edge portions of said marginal regions during the compressing and heating of said intermediate portion in order to reduce the thickness of said double thickness area at said intermediate portion to substantially the thickness of one of said sheets.

References Cited
UNITED STATES PATENTS

| | | | |
|---|---|---|---|
| 3,184,354 | 5/1965 | Strother | 156—73 |
| 3,022,814 | 2/1962 | Bodine | 156—73 |
| 3,308,003 | 3/1967 | Deans | 156—580 |
| 3,225,999 | 12/1965 | Heller et al. | 228—1 |

PHILIP DIER, *Primary Examiner.*

U.S. Cl. X.R.

156—251, 304, 515, 580; 228—1; 29—470.3

UNITED STATES PATENT OFFICE
CERTIFICATE OF CORRECTION

Patent No. 3,419,447 December 31, 1968

Eugene E. Hewitt

It is certified that error appears in the above identified patent and that said Letters Patent are hereby corrected as shown below:

Column 6, line 52, after "bracket" insert -- 71 --. Column 7, line 57, "sheets comprising" should read -- sheets, comprising --. Column 8, line 22, "step" should read -- step. --; lines 32 and 33, "unbanded" should read -- unbonded --.

Signed and sealed this 17th day of March 1970.

(SEAL)
Attest:

Edward M. Fletcher, Jr.
Attesting Officer

WILLIAM E. SCHUYLER, JR.
Commissioner of Patents